(12) United States Patent
Seon (10) Patent No.: US 10,176,951 B2
(45) Date of Patent: Jan. 8, 2019

(54) CONSTANT VOLTAGE SUPPLYING CIRCUIT FOR CIRCUIT BREAKER

(71) Applicant: LSIS CO., LTD., Anyang-si, Gyeonggi-do (KR)

(72) Inventor: Jongkug Seon, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 297 days.

(21) Appl. No.: 15/135,446

(22) Filed: Apr. 21, 2016

(65) Prior Publication Data

US 2017/0004944 A1     Jan. 5, 2017

(30) Foreign Application Priority Data

Jul. 1, 2015 (KR) .................. 10-2015-0094127

(51) Int. Cl.
*H01H 47/22* (2006.01)
*H01H 47/00* (2006.01)
(Continued)

(52) U.S. Cl.
CPC ............ *H01H 47/223* (2013.01); *G05F 1/46* (2013.01); *H01H 47/002* (2013.01); *H02M 3/156* (2013.01); *H02M 7/06* (2013.01)

(58) Field of Classification Search
CPC ...... H01H 47/002; H01H 47/223; G05F 1/46; H02M 7/06; H02M 3/156
(Continued)

(56) References Cited

U.S. PATENT DOCUMENTS

| 4,833,563 A | 5/1989 | Russell |
| 6,233,128 B1 | 5/2001 | Spencer et al. |

(Continued)

FOREIGN PATENT DOCUMENTS

| CN | 1381774 A | 11/2002 |
| JP | 2007026337 | 2/2007 |

(Continued)

OTHER PUBLICATIONS

Machine Translation of Japanese Patent Document JP 2016021297 A, Feb. 2016.*

(Continued)

*Primary Examiner* — Kevin J Comber
(74) *Attorney, Agent, or Firm* — K&L Gates LLP (57) ABSTRACT

The constant voltage supplying circuit for a circuit breaker according the invention comprises: a first switching device; a constant current source configured to supply a constant current; a feedback circuit section commonly connected to an output terminal of each of the first switching device and the constant current source; a constant voltage source connected to the feedback circuit section, and configured to supply a constant voltage; a current adjusting circuit section connected to the output terminal of the first switching device, and configured to adjust an output current of the first switching device; and a divided voltage resistor section including a first resistor and a second resistor, and configured to provide a divided voltage of an output voltage of the constant voltage supplying circuit, to the feedback circuit section, through a connection node between the first resistor and the second resistor.

5 Claims, 4 Drawing Sheets

(51) Int. Cl.
*G05F 1/46* (2006.01)
*H02M 3/156* (2006.01)
*H02M 7/06* (2006.01)

(58) Field of Classification Search
USPC .......................................................... 361/170
See application file for complete search history.

(56) References Cited

U.S. PATENT DOCUMENTS

| | | | | |
|---|---|---|---|---|
| 2003/0030417 | A1* | 2/2003 | Takabayashi | G05F 1/618 323/223 |
| 2015/0029768 | A1* | 1/2015 | Morrish | H02M 7/2176 363/84 |
| 2016/0025792 | A1* | 1/2016 | Oestreicher | G01R 31/025 324/538 |

FOREIGN PATENT DOCUMENTS

| | | |
|---|---|---|
| JP | 2007181290 | 7/2007 |
| JP | 2007334573 | 12/2007 |
| JP | 201486073 | 5/2014 |
| JP | 2016021297 A * | 2/2016 |
| JP | 2016525259 A | 8/2016 |
| KR | 1020050040718 | 5/2005 |
| KR | 20070029862 | 3/2007 |
| KR | 101001768 | 12/2010 |
| KR | 20120135824 | 12/2012 |
| WO | 2015013642 | 1/2015 |

OTHER PUBLICATIONS

Japanese Notice of Allowance for related Japanese Application No. 2016-097698; action dated Oct. 31, 2017; (1 page).
Japan Patent Office Application No. 2016-097698, Office Action dated Jul. 4, 2017, 3 pages.
European Patent Office Application Serial No. 16166837.1, Search Report dated Dec. 15, 2016, 6 pages.
Korean Intellectual Property Office Application No. 10-2015-0094127, Office Action dated Nov. 15, 2016, 5 pages.
Chinese Office Action for related Chinese Application No. 201610446199.X; action dated Apr. 3, 2018; (8 pages).

* cited by examiner

CONSTANT VOLTAGE SUPPLYING CIRCUIT FOR CIRCUIT BREAKER

CROSS-REFERENCE TO RELATED APPLICATION

Pursuant to 35 U.S.C. § 119(a), this application claims the benefit of earlier filing date and right of priority to Korean Application No. 10-2015-0094127, filed on Jul. 1, 2015, the contents of which are all hereby incorporated by reference herein in its entirety.

BACKGROUND OF THE INVENTION

1. Field of the Invention

The present invention relates to a circuit breaker having an electronic circuit, and more particularly, to a constant voltage supplying circuit for a circuit breaker, capable of supplying a direct current constant voltage obtained by converting a wide range of alternating current input voltage (e.g. AC 100V~460V) into a stable and constant small voltage to an electronic circuit section such as a trip controller, in the circuit breaker.

2. Background of the Invention

The present invention relates to a constant voltage supplying circuit for a circuit breaker, capable of supplying a direct current constant voltage to electronic components requiring low power consumption for a low-voltage circuit breaker having a rated voltage less than several hundred volts, or a low-voltage earth leakage circuit breaker, by converting an alternating current into a direct current.

In such a constant voltage supplying circuit for a circuit breaker, the following patent documents may be referred as the conventional art.

(Patent Document 1) KR10-2005-0040718 A
(Patent Document 2) KR10-1001768 B1

However, in case of a power supplying circuit according to the conventional art of the patent document 1, a constant current not a constant voltage is supplied to a circuit breaker. Further, a current is unnecessarily much consumed to a ground by a capacitor (indicated by reference numeral 'C2' in the patent document 1) connected to an output terminal for stabilization. This may lower power supply efficiency.

Further, in a constant voltage circuit according to the conventional art of the patent document 2, a resistor connected to an input terminal in parallel to a first transistor (the resistor indicated by reference numeral R11, etc. in the patent document 2), has a very large size. This may cause a large occupation area, a high price and high heat emission.

SUMMARY OF THE INVENTION

Therefore, an aspect of the present disclosure is to provide a constant voltage supplying circuit for a circuit breaker, capable of minimizing unnecessary current consumption, not installing a resistor to an input terminal, and solving the conventional problems such as a large occupation area, a high price and high heat emission.

To achieve these and other advantages and in accordance with the purpose of this specification, as embodied and broadly described herein, there is provided a constant voltage supplying circuit for a circuit breaker, which receives a direct current input voltage obtained by converting an alternating current to a direct current from a rectifying circuit, the constant voltage supplying circuit comprising:

a first switching device configured to supply the direct current input voltage after stepping down a voltage;

a constant current source connected to the first switching device in parallel, and configured to supply a constant current;

a feedback circuit section commonly connected to the first switching device and output terminal of the constant current source;

a constant voltage source connected to the feedback circuit section, and configured to supply a constant voltage;

a current adjusting circuit section connected to the output terminal of the first switching device, and configured to adjust an output current of the first switching device; and a divided voltage resistor section connected to an output terminal of the current adjusting circuit section and a ground, including a first resistor and a second resistor, and configured to provide a divided voltage of an output voltage of the constant voltage supplying circuit, to the feedback circuit section, through a connection node between the first resistor and the second resistor.

According to an aspect of the present invention, the constant current source comprises a Depletion Metal Oxide Semiconductor (DMOS) transistor, and a resistor connected to the DMOS transistor.

According to another aspect of the present invention, the feedback circuit section comprises an operational amplifier.

According to still another aspect of the present invention, the feedback circuit section comprises a transistor.

According to still another aspect of the present invention, the constant voltage source comprises a Zener diode.

According to still another aspect of the present invention, the current adjusting circuit section comprises a current limiting resistor; and a transistor that is turned on or off according to an amount of a current flows through the current limiting resistor, and wherein the current adjusting circuit section is configured to turn off the first switching device when the transistor is turned on.

According to still another aspect of the present invention, the first switching device is configured with a pass transistor that provides a direct current input voltage after stepping down a voltage.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of preferred configurations of a constant voltage supplying circuit for a circuit breaker according to the present invention, with reference to the accompanying drawings.

Firstly, a configuration of a constant voltage supplying circuit for a circuit breaker according to an embodiment the present invention will be explained with reference to FIG. 1.

The constant voltage supplying circuit 10 for a circuit breaker according to an embodiment the present invention may be configured as a printed circuit board fixedly-installed in an enclosure of a low voltage circuit breaker such as a molded case circuit breaker or an earth leakage circuit breaker. Referring to FIG. 1, reference numeral 1 designates an alternating current electric power source (abbreviated as "AC power source" hereinafter), and may be configured as a three-phase commercial alternating current power source.

Figure 1:
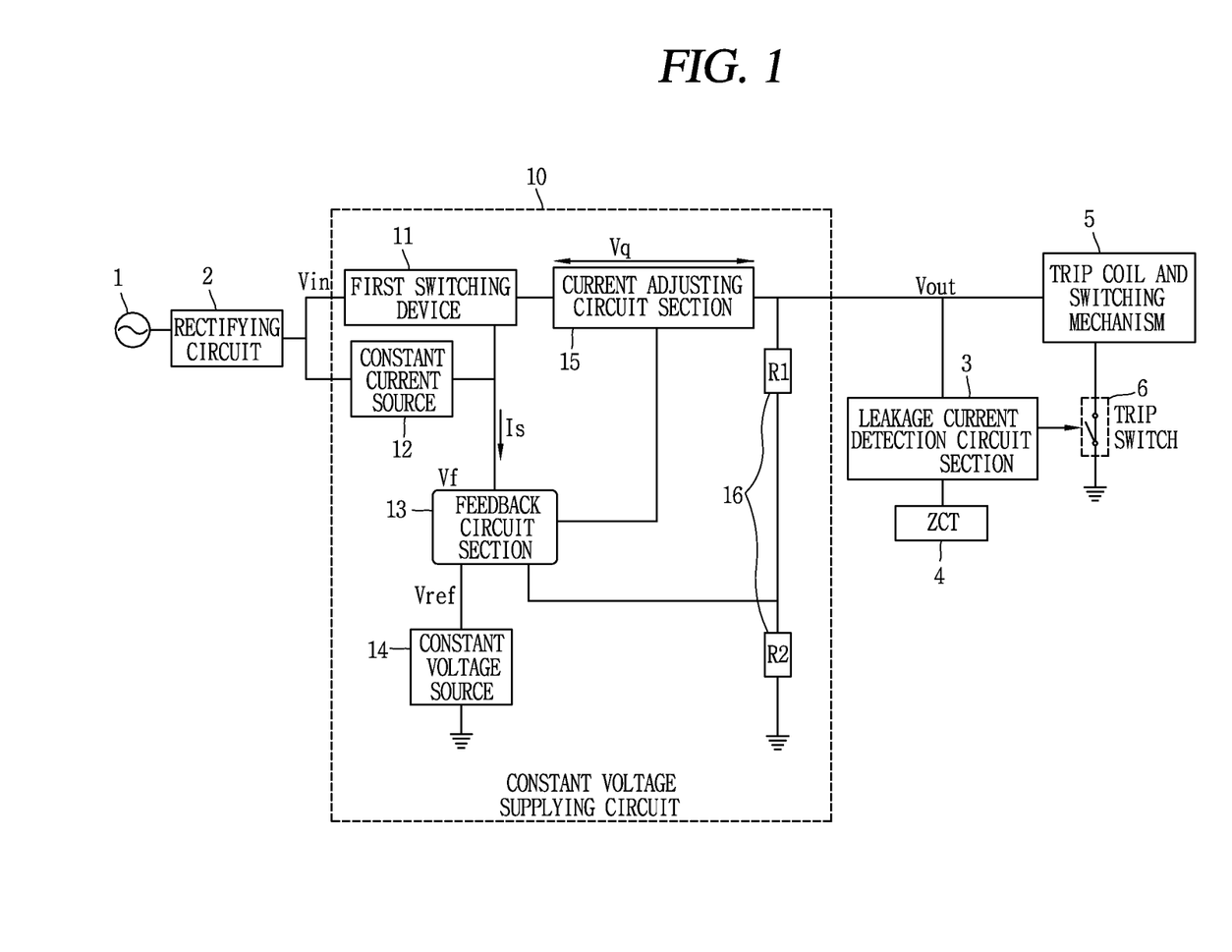
FIG. 1 is a block diagram illustrating a constant voltage supplying circuit for a circuit breaker according to a preferred embodiment of the present invention.

Referring to FIG. 1, reference numeral 2 designates a rectifying circuit for supplying a direct current input voltage obtained by converting an alternating current into a direct current, to the constant voltage supplying circuit 10. The rectifying circuit may be configured with a diode bridge circuit. In a case where the AC power source 1 is a three-phases AC power source, the rectifying circuit converts an alternating current for one of three phases into a direct current, thereby supplying the direct current.

The constant voltage supplying circuit 10 comprises a first switching device 11, a constant current source 12, a feedback circuit section 13, a constant voltage source 14, a current adjusting circuit section 15, and a divided voltage resistor section 16.

The first switching device 11 lowers (in other words "drops") a direct current input voltage supplied from the rectifying circuit 2, and supplies the direct current input voltage.

The first switching device 11 can be configured as a pass transistor that provides a direct current input voltage after stepping down a voltage. The pass transistor is a switching device for controlling a high voltage and a large current. In the present invention, the pass transistor is used to utilize one of a high voltage control characteristic and a large current control characteristic, or both of the characteristics.

Figure 7:
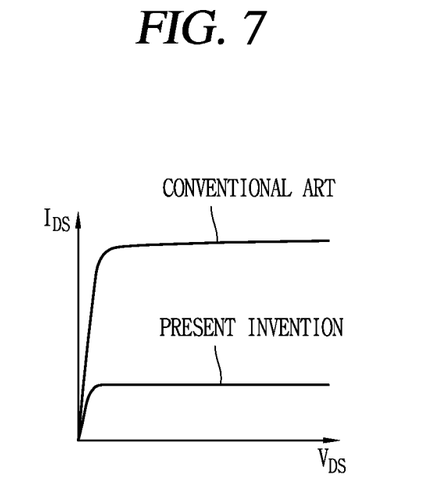
FIG. 7 is waveform diagrams comparing a current and voltage characteristic between a drain and a source of a first switching device in the conventional art, with that in a constant voltage supplying circuit for a circuit breaker according to an embodiment of the present invention.

A voltage ($V_{DS}$) between a drain and a source, and a current ($I_{DS}$) between a drain and a source, of the pass transistor serving as the first switching device 11 have a characteristic shown in FIG. 7. Referring to FIG. 7, as the voltage ($V_{DS}$) between a drain and a source is increased, the characteristics of current ($I_{DS}$) between a drain and a source shows a characteristics converging to a constant value. In the conventional art using a general transistor, the current ($I_{DS}$) between a drain and a source has a comparatively large converged value of about 1 A. On the other hand, in the present invention using the pass transistor, the current ($I_{DS}$) between a drain and a source has a comparatively small converged value of about 1 mA.

If an AC voltage of about 800V is applied to a circuit breaker as the AC electric source 1, the voltage ($V_{DS}$) between a drain and a source of the first switching device 11 may be lowered to about 10V.

The first switching device 11 may have a source connected to an input terminal of the rectifying circuit 2, a drain connected to the current adjusting circuit section 15, and a gate connected to the feedback circuit section 13.

The constant current source 12 is a means for supplying a constant current by being connected to the first switching device 11 in parallel. The constant current source 12 supplies only a minimum current (Is) required by the feedback circuit section 13 and the constant voltage source 14.

Figure 2:
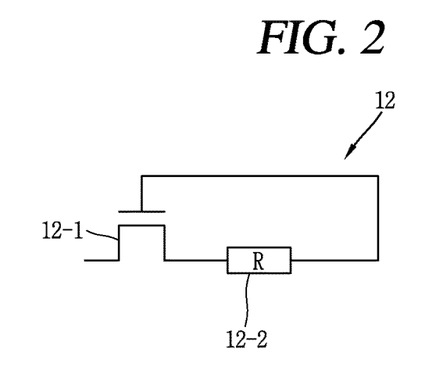
FIG. 2 is a circuit diagram illustrating an embodiment of a constant current source in a constant voltage supplying circuit for a circuit breaker according to an embodiment of the present invention.

As shown in FIG. 2, the constant current source 12 may include a Depletion Metal Oxide Semiconductor (abbreviated as "DMOS" hereinafter) transistor 12-1, and a resistor 12-2 connected to the DMOS transistor 12-1.

A source of the DMOS transistor 12-1 may be connected to an input terminal of a direct current input voltage (Vin) supplied from the rectifying circuit 2, and a drain of the DMOS transistor 12-1 may be connected to the resistor 12-2.

The DMOS transistor 12-1 is a switching device (a switching element) capable of enabling a current flow between a drain and a source by forming a current flowing channel when a gate voltage is not applied thereto, and capable of breaking current supply between the drain and the source by closing the current flowing channel when a gate voltage is applied thereto.

Thus, the DMOS transistor 12-1 of the present invention serves to supply a current to the feedback circuit section 13 by enabling a current flow between a drain and a source by forming a current flowing channel at an initial operation time of the constant voltage supplying circuit 10.

Then, if an output voltage (Vf) of the feedback circuit section 13 is formed to apply a gate voltage, the DMOS transistor 12-1 breaks the current flowing channel. As a result, a current path from the direct current input voltage (Vin) to the constant current source 12 is disconnected, and only a current path of the first switching device 11 remains.

The resistor 12-2 may have one end connected to a drain of the DMOS transistor 12-1, and another end connected to a gate of the DMOS transistor 12-1 and the feedback circuit section 13.

The resistor 12-2 limits current flow from the drain of the DMOS transistor 12-1 to the feedback circuit section 13.

The feedback circuit section 13 is commonly connected to an output terminals of the first switching device 11 and the constant current source 12.

The feedback circuit section 13 is connected to the constant voltage source 14 and the current adjusting circuit section 15. Further, the feedback circuit section 13 is connected between a resistor (R1) and a resistor (R2) of the divided voltage resistor section 16.

If the switching device inside the current adjusting circuit section 15 is turned on as a large amount of current flows through the current adjusting circuit section 15, a voltage applied to the gate of the first switching device 11 is reduced to a value lower than a threshold voltage. As a result, the first switching device 11 is turned off, and an output current flows to an output terminal of the constant voltage supplying circuit 10 is reduced. In this case, a current path from the feedback circuit section 13 to the gate of the first switching device 11 is disconnected, and a current path from the feedback circuit section 13 to the output terminal of the constant voltage supplying circuit 10 through the current adjusting circuit section 15 is created.

Once the first switching device 11 is turned off, the switching device inside the current adjusting circuit section 15 is turned off, because a small amount of current flows through the current adjusting circuit section 15. And a current path from the feedback circuit section 13 to the gate of the first switching device 11 is created, and a feedback voltage (Vf) of the first switching device 11 is re-applied to the gate of the first switching device 11. As a result, the first switching device 11 is turned on. If a large amount of output current flows to the output terminal of the constant voltage supplying circuit 10, the switching device inside the current adjusting circuit section 15 is turned on and the first switching device 11 is turned off. On the other hand, if a small amount of output current flows to the output terminal of the constant voltage supplying circuit 10, the switching device inside the current adjusting circuit section 15 is turned off and the first switching device 11 is turned on. With such a configuration, the amount of an output current flowing to the output terminal of the constant voltage supplying circuit 10 may be maintained constantly.

As aforementioned, the feedback circuit section 13 is used as a means to turn on or turn off the first switching device 11 according to an operation state of the current adjusting circuit section 15.

Figure 4:
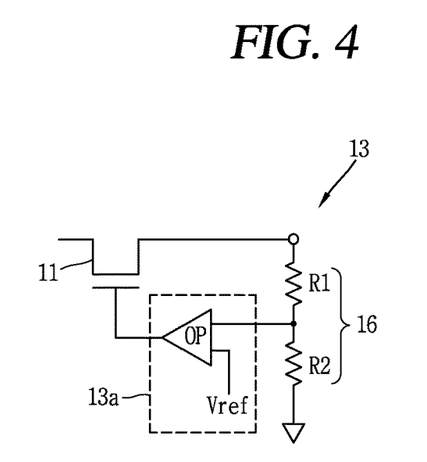
FIG. 4 is a circuit diagram illustrating an embodiment of a feedback circuit section in a constant voltage supplying circuit for a circuit breaker according to an embodiment of the present invention.

Referring to FIG. 4, the feedback circuit section 13 may include an operational amplifier 13a.

In another embodiment, the feedback circuit section 13 may be configured with a transistor (not shown). If the feedback circuit section 13 is configured with a bipolar transistor, a collector of the bipolar transistor is connected to the constant current source 12 and the first switching device 11, and a base of the bipolar transistor is connected to the resistor (R1) and the resistor (R2) of the divided voltage resistor section 16. And an emitter of the bipolar transistor is connected to the constant voltage source 14.

The constant voltage source 14 is connected to the feedback circuit section 13, and supplies a reference voltage Vref as a constant voltage to the feedback circuit section 13.

The constant voltage source 14 may be configured with a Zener diode.

The current adjusting circuit section 15 is connected to the output terminal of the first switching device 11, and adjusts an output current of the first switching device to be constant.

Figure 3:
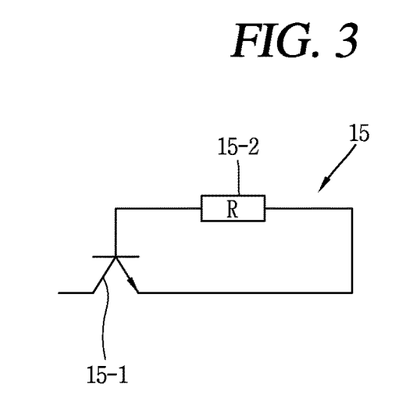
FIG. 3 is a circuit diagram illustrating an embodiment of a current adjusting circuit section in a constant voltage supplying circuit for a circuit breaker according to an embodiment of the present invention.

Referring to FIG. 3, the current adjusting circuit section 15 includes a current limiting resistor 15-2, and a transistor 15-1 turned on or off according to the amount of a current flowing to the current limiting resistor 15-2. And the current adjusting circuit section 15 is configured to turn off the first switching device 11 when the transistor 15-1 is turned on.

That is, if the transistor 15-1 is turned on as a large amount of current flows through the current limiting resistor 15-2, a voltage applied to the gate of the first switching device 11 is reduced to a value less than a threshold voltage. As a result, the first switching device 11 is turned off. Thus, the amount of an output current flowing to the output terminal of the constant voltage supplying circuit 10 is reduced.

When the first switching device 11 is turned off, the transistor 15-1 is turned off since the amount of a current flowing through the current adjusting circuit section 15 is reduced. And a current path from the feedback circuit section 13 to the gate of the first switching device 11 is created, and the feedback voltage (Vf) of the first switching device 11 is re-applied to the gate of the first switching device 11. As a result, the first switching device 11 is turned on. If a large amount of output current flows to the output terminal of the constant voltage supplying circuit 10, the transistor 15-1 of the current adjusting circuit section 15 is turned on and the first switching device 11 is turned off. On the other hand, if a small amount of output current flows to the output terminal of the constant voltage supplying circuit 10, the transistor 15-1 of the current adjusting circuit section 15 is turned off and the first switching device 11 is turned on. With such a configuration, the amount of an output current flowing to the output terminal of the constant voltage supplying circuit 10 may be maintained constantly.

The divided voltage resistor section 16 is connected between an output terminal of the current adjusting circuit section 15 and a ground, and includes a first resistor (R1) and a second resistor (R2).

The divided voltage resistor section 16 provides a divided voltage of an output voltage (Vout) of the constant voltage supplying circuit 10 to the feedback circuit section 13, through a connection node between the first resistor (R1) and the second resistor (R2).

An operation of the constant voltage supplying circuit for a circuit breaker according to an embodiment of the present invention will be explained with reference to FIG. 1 mainly, and other figures adjunctively.

Since an alternating current supplied from the AC power source 1 is converted (rectified) into a direct current by the rectifying circuit 2 of FIG. 1, a direct current input voltage (Vin) is supplied to the constant voltage supplying circuit 10.

At an initial time when the direct current input voltage (Vin) is supplied to the constant voltage supplying circuit 10, the first switching device 11 is turned off, and the DMOS transistor 12-1 of the constant current source 12 forms a current flowing channel. The DMOS transistor 12-1 supplies a current to the feedback circuit section 13 by enabling a current flow between the drain and the source of the DMOS transistor 12-1.

Thus, the constant current source 12 supplies a minimum current (Is) required by the feedback circuit section 13 and the constant voltage source 14.

The feedback circuit section 13 applies, to the first switching device 11 and the current adjusting circuit section 15, a reference voltage (Vref) of the constant voltage source 14 and a voltage according to a ratio of the first resistor (R1) and the second resistor (R2) in the divided voltage resistor section 16.

That is, the voltage applied by the feedback circuit section 13 may be obtained as follows.

$$V_f = V_{ref} \times \left(1 + \frac{R1}{R2}\right) \tag{Formula 1}$$

Here, the Vf designates an output voltage (applying voltage) of the feedback circuit section 13, $V_{ref}$ designates a reference voltage provided from the constant voltage source 14, and R1 and R2 designate a resistance of the first resistor and a resistance of the second resistor.

The Vref has a constant reference voltage provided from the constant voltage source 14, and each of the R1 and R2 has a constant resistance value. Thus, the output voltage (applying voltage) of the feedback circuit section 13 has a constant value.

Since the output voltage of the feedback circuit section 13 is larger than a gate threshold voltage of the first switching device 11, the first switching device 11 is turned on as the output voltage is applied.

The direct current input voltage (Vin) is lowered to a desired value by the turned-on first switching device 11, and is applied to the current adjusting circuit section 15.

A final output voltage (Vout) of the constant voltage supplying circuit 10 may be obtained as the following formula 2, according to a relation among the output voltage (Vf) of the feedback circuit section 13, a gate-source voltage (Vgs) of the first switching device 11, and a voltage drop (Vq) of the current adjusting circuit section 15.

$$V_{out} = V_f - V_{gs} - V_q \quad \text{(Formula 2)}$$

Here, the output voltage (Vf) of the feedback circuit section 13 is constant as aforementioned, the gate-source voltage (Vgs) of the first switching device 11 is constant if the direct current input voltage (Vin) is constant, and the voltage drop (Vq) of the current adjusting circuit section 15 is constant. Thus, the final output voltage (Vout) of the constant voltage supplying circuit 10 may be maintained constantly.

The transistor 15-1 of the current adjusting circuit section 15 is turned on or turned off according to the amount of a current flowing through the current adjusting circuit section 15, thereby constantly maintaining an output current of the constant voltage supplying circuit 10.

Figure 5:
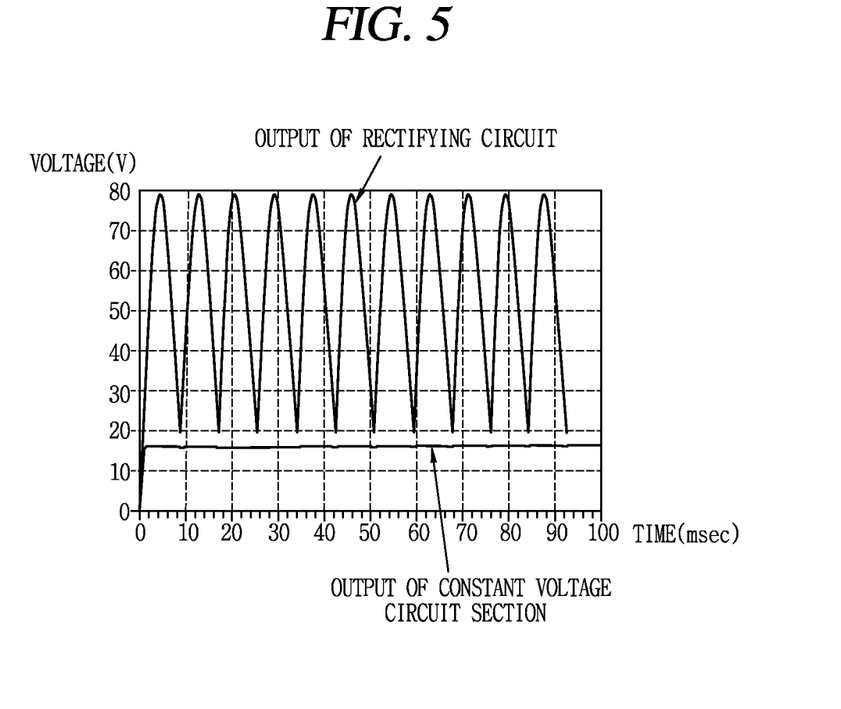
FIG. 5 is a waveform diagram illustrating waveforms of an input signal and an output signal in a constant voltage supplying circuit for a circuit breaker according to an embodiment of the present invention.

For instance, as shown in FIG. 5, when a peak value of a direct current voltage supplied from the rectifying circuit 2 is 80(V), the final output voltage (Vout) of the constant voltage supplying circuit 10 may be maintained constantly as about 15(V).

Figure 6:
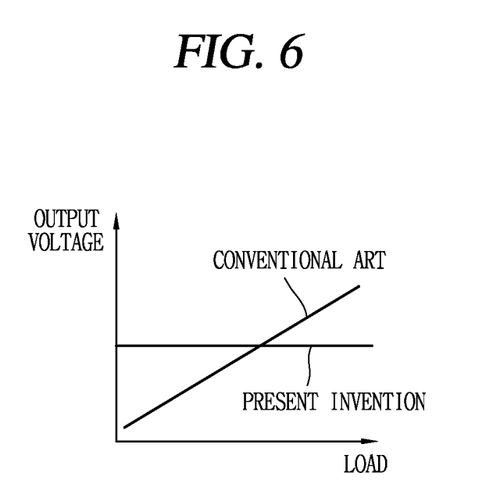
FIG. 6 is waveform diagrams comparing a change of an output voltage of a constant voltage circuit according to a change of load resistance in the conventional art, with that in a constant voltage supplying circuit for a circuit breaker according to an embodiment of the present invention.

Referring to FIG. 6, in the conventional art, a final output voltage (Vout) of a constant voltage supplying circuit is increased as a load is increased. On the other hand, in the present invention, the final output voltage (Vout) of the constant voltage supplying circuit 10 may be maintained constantly as a load is increased.

The final output voltage (Vout) of the constant voltage supplying circuit 10 is supplied to an Zero Current Transformer (ZCT) 4, a leakage current detection circuit section 3, a trip switch 6 and a trip coil and a switching mechanism 5, etc. of FIG. 1.

The ZCT 4 is an element, which outputs a voltage signal corresponding to a leakage current which flows to a ground.

The leakage current detection circuit section 3 compares a reference value (the reference value set for determination of a predetermined electric leakage) with respect to an output voltage of the ZCT 4, with a value represented by an output voltage signal of the ZCT 4. If the value of the output voltage of the ZCT 4 is not less than the reference value, it is determined that electric leakage has occurred, and the trip switch 6 is controlled to be switched to a closing position. The trip switch 6 may be configured with a switching device such as a transistor.

Then, as the trip switch 6 is switched to the closing position, the final output voltage (Vout) of the constant voltage supplying circuit 10 is supplied to the trip coil of the trip coil and switching mechanism 5. As a result, the corresponding trip coils are magnetized.

As a trip mechanism such as an amateur (not shown) executes a trigger operation by the magnetization of the trip coil, the trip coil and switching mechanism 5 drive a movable contact arm (not shown) to a position where the movable contact arm is separated from a stationary contact arm. As a result, a circuit is broken, and the circuit, electric load (utilization equipment) connected to the circuit, etc. are protected from electric leakage.

The constant voltage supplying circuit for a circuit breaker according to the present invention may have the following advantages.

Firstly, since the constant voltage supplying circuit for a circuit breaker according to the present invention comprises the constant current source instead of a resistor for voltage drop is installed at an input terminal in the conventional art, heat emission, a large occupation area and a high price due to the resistor may be solved.

Secondly, in the constant voltage supplying circuit for a circuit breaker according to the present invention, a constant DC voltage may be provided as an input voltage is lowered by the constant current source, the pass transistor, and the feedback circuit section.

Thirdly, the constant voltage supplying circuit for a circuit breaker according to the present invention comprises the current adjusting circuit section, so a limited current is supplied until an output voltage of each of the feedback circuit section becomes stabilized. Further, unnecessary current consumption is limited if the output voltage of the feedback circuit section becomes stable to a level of a final output voltage of the constant voltage supplying circuit. This may allow an output current and an output voltage of the constant voltage supplying circuit to be maintained constantly, regardless of a change of an output side load.

Fourthly, in the constant voltage supplying circuit for a circuit breaker according to the present invention, a standby power may be reduced due to small current consumption.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A constant voltage supplying circuit for a circuit breaker, which receives a direct current input voltage obtained by converting an alternating current to a direct current from a rectifying circuit, the constant voltage supplying circuit comprising:
    a first switching device configured to supply the direct current input voltage after stepping down a voltage;
    a constant current source connected to the first switching device in parallel, and configured to supply a constant current;
    a feedback circuit section commonly connected to the first switching device and an output terminal of the constant current source;
    a constant voltage source, separate from the feedback circuit section, connected to the feedback circuit section, and configured to supply a constant voltage;
    a current adjusting circuit section, separate from the feedback circuit section, connected to an output terminal of the first switching device, and configured to adjust an output current of the first switching device; and a divided voltage resistor section, separate from the feedback circuit section, connected to an output terminal of the current adjusting circuit section and a ground, including a first resistor and a second resistor, and configured to provide a divided voltage of an output voltage of the constant voltage supplying circuit, to the feedback circuit section, through a connection node between the first resistor and the second resistor, wherein the first switching device comprises a pass transistor without a resistor connected to the pass transistor in parallel, wherein the constant current source comprises a Depletion Metal Oxide Semiconductor (DMOS) transistor and a resistor connected to the DMOS transistor, wherein the DMOS transistor is configured to supply a current to the feedback circuit section by forming a current flowing channel at an initial operation time of the constant voltage supplying circuit, and wherein if an output voltage of the feedback circuit section is formed to apply a gate voltage for the first switching device, the DMOS transistor breaks the current flowing channel.

2. The constant voltage supplying circuit for a circuit breaker of claim 1, wherein the feedback circuit section comprises an operational amplifier.

3. The constant voltage supplying circuit for a circuit breaker of claim 1, wherein the feedback circuit section comprises a transistor.

4. The constant voltage supplying circuit for a circuit breaker of claim 1, wherein the constant voltage source comprises a Zener diode.

5. The constant voltage supplying circuit for a circuit breaker of claim 1, wherein the current adjusting circuit section comprises:

a current limiting resistor; and a transistor that is turned on or off according to an amount of a current flows through the current limiting resistor, and wherein the current adjusting circuit section is configured to turn off the first switching device when the transistor is turned on.

* * * * *